Aug. 13, 1940.                S. BROKES                2,211,534
            MOTOR VEHICLE AUTOMATIC REVERSE BRAKE
                   Filed July 16, 1938        3 Sheets-Sheet 1

Inventor:
SYLVESTER BROKES
By
Chester Mueller
        Attorney.

Aug. 13, 1940.                S. BROKES                    2,211,534
                    MOTOR VEHICLE AUTOMATIC REVERSE BRAKE
                       Filed July 16, 1938      3 Sheets-Sheet 2
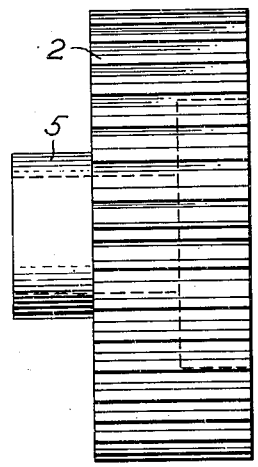
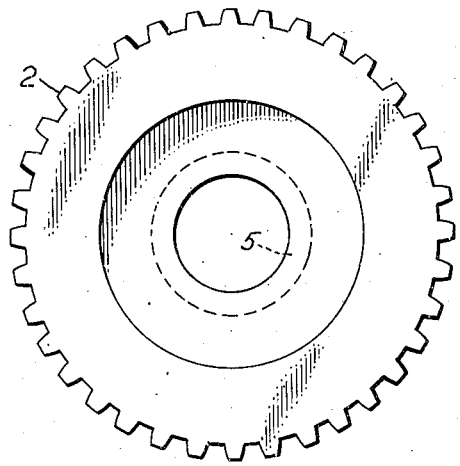
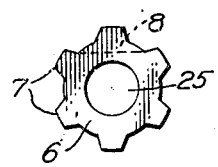
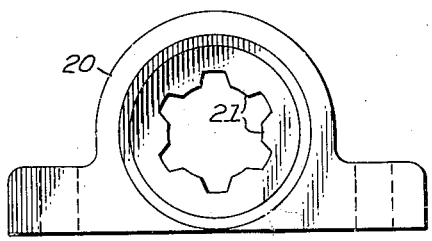
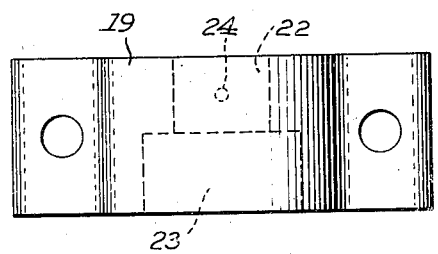
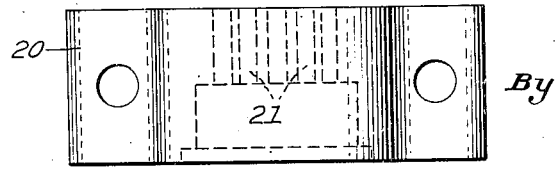
Inventor:
SYLVESTER BROKES
By
Chester Mueller
Attorney.

Aug. 13, 1940.           S. BROKES            2,211,534
MOTOR VEHICLE AUTOMATIC REVERSE BRAKE
Filed July 16, 1939        3 Sheets-Sheet 3
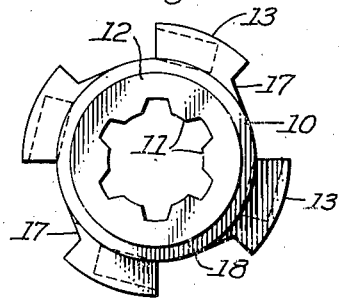
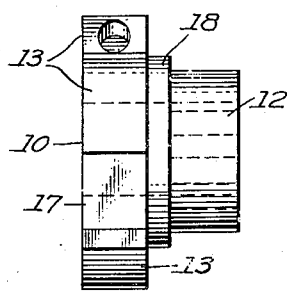
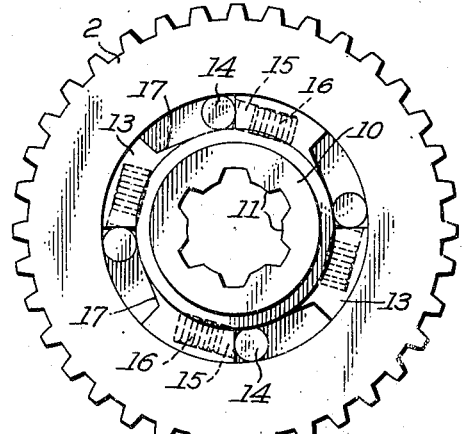
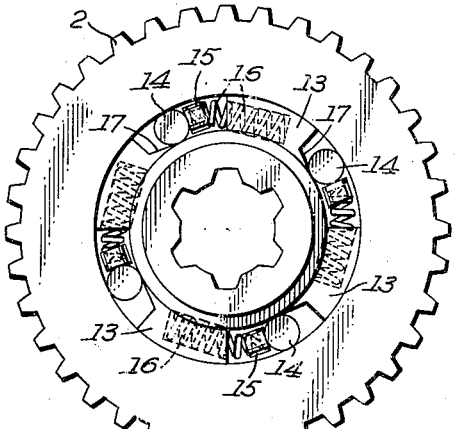
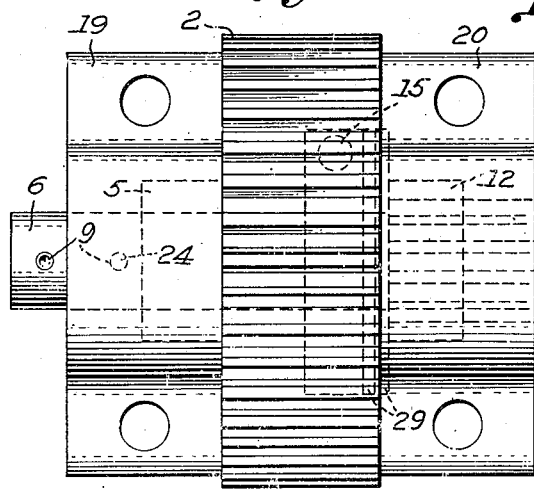
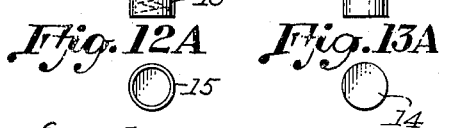
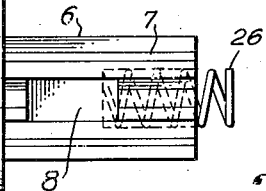
Inventor.
SYLVESTER BROKES
By
Chester Mueller
Attorney.

Patented Aug. 13, 1940

2,211,534

UNITED STATES PATENT OFFICE 2,211,534

MOTOR VEHICLE AUTOMATIC REVERSE BRAKE

Sylvester Brokes, Hillside, N. J.

Application July 16, 1938, Serial No. 219,529

9 Claims. (Cl. 192—4)

This invention relates to motor vehicles and more specifically to a braking device geared to the drive shaft.

The principle object of my invention is to provide automatic braking means whereby a motor vehicle cannot move in a backward direction unless its gears are placed "in reverse."

Another object is to make such a device fool proof and fully automatic without interfering with the usual operation of the vehicle.

Still another object is to apply the braking effect the instant the vehicle begins to move rearward, whether the gears be in any forward position or "in neutral."

A further object is to provide a compact inexpensive device that may be attached to the transmission or drive shaft of any motor vehicle or may be incorporated in the manufacture of new motor vehicles of whatever design.

Other objects will appear from the description following.

At the present time as all operators of motor vehicle equipment know, there does not exist a reliable means for safeguarding a car from rolling backward down a hill. Frequently vehicles are required to stop and start when only part way up an inclined street or highway. Many drivers fail to acquire the knack of starting a vehicle on a hill without letting it roll back away, and to all drivers it is an annoyance. Failure to engage the clutch simultaneously with the release of the hand or foot brake, and at the same time to accelerate the motor, often causes danger to life and property when the car rolls backward. Inexperienced drivers have been known to completely lose control of the vehicle once a backward movement starts. Parking a vehicle facing uphill also may be hazardous, the accidental release of the hand brake allowing it to roll down hill.

Heretofore indifferent success has attached efforts to secure a motor vehicle from undesired, gravity actuated backward movement. Provision in hydraulic brake systems has been made in some cases but positive action at all times when required is not assured. My invention is certain to function whenever it is needed and will firmly secure the vehicle at all times from rolling backward unless the operator intends it to do so by first placing the gears "in reverse."

One embodiment of my invention is illustrated in the accompanying drawings in which the same identifying numbers refer to the same or similar parts.

Figure 3 is a side elevational view of the gear of my device.

Figure 4 is a front elevational view of the gear of Figure 3.

Figure 5 is a side elevational view of the shaft about which my device functions.

Figure 6 is an end view of the shaft of Figure 5.

Figure 7 is a front elevational view of one support for the shaft of Figure 5.

Figure 8 is a plan view of the other support for the shaft of Figure 5.

Figure 9 is a plan view of the support shown in Figure 7.

Figure 10 is a front elevational view of the inner brake member of my device.

Figure 11 is a side elevational view of the inner brake member.

Figure 12 is one of the coil springs and Figure 13 one of the roller bearings appurtenant to the inner brake member of Figure 9.

Figure 12A is a view of the open end of the spring cap shown in Figure 12.

Figure 13A is an end view of the roller bearing illustrated in Figure 13.

Figure 14 is a front elevational view of the gear with contained inner brake members in locked position.

Figure 15 is a front elevational view of the gear with contained inner brake member in locked position.

Figure 16 is a plan view of the complete device assembled.

Figure 1:
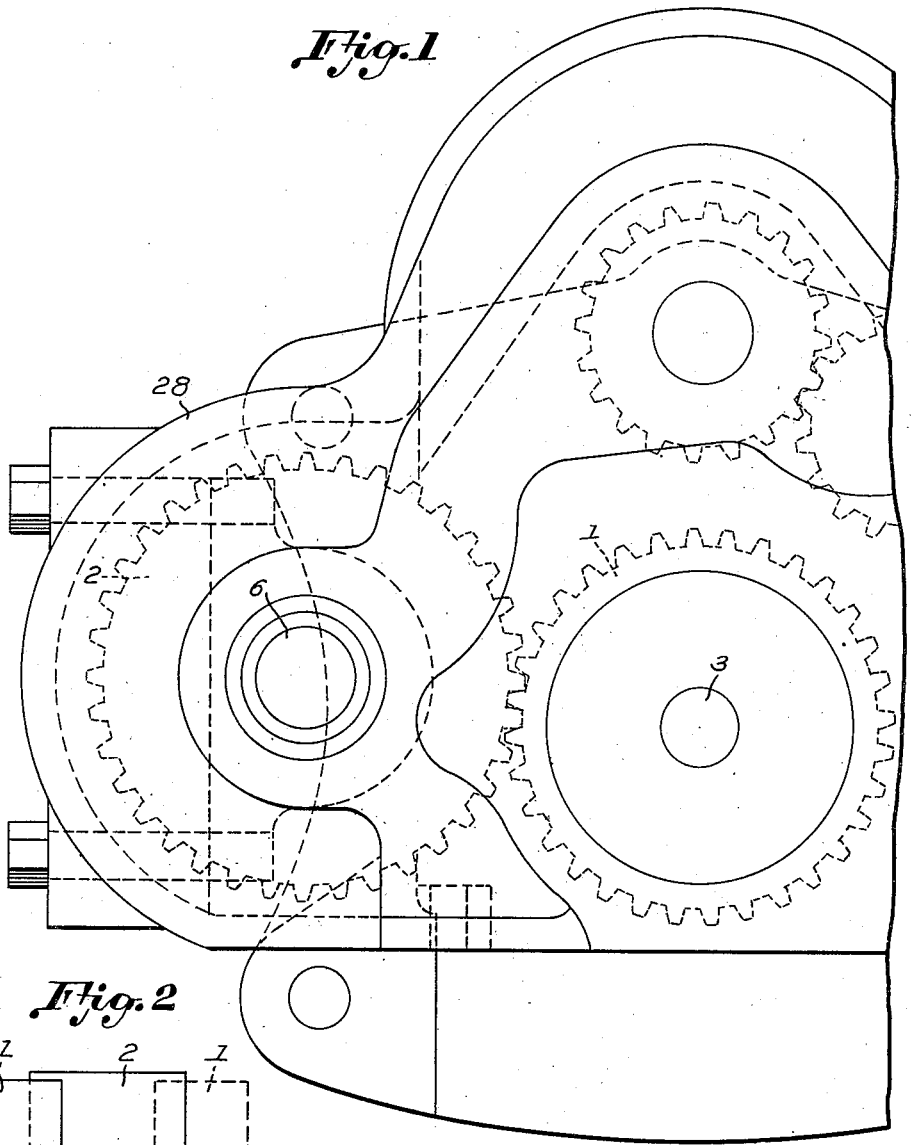
Figure 1 is a front elevational view within a transmission case showing my device geared to standard conventional gear.
Figure 2:
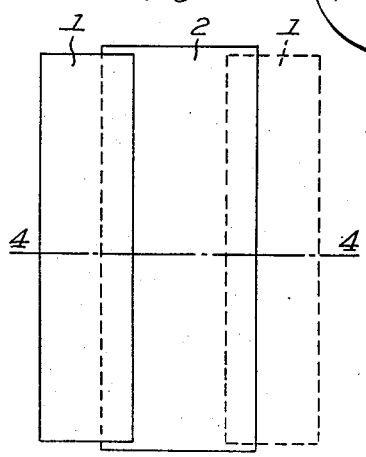
Figure 2 is a side elevational view of the gears of Figure 1 in outline only showing two possible positions of the standard conventional gear with respect to the gear of my device.

Referring to Figure 1, gear 1 is that gear which in the conventional gear transmission system rotates at all times with drive shaft 3. My device is applied at this point in the standard transmissions in the form of wheel or counter gear 2 which is meshed with gear 1. These two gears are always in mesh irrespective of the position of gear 1, which is slideable on drive shaft 3 to place it "in gear" or "in neutral." Figure 2 illustrates in outline these two positions of gear 1 with respect to gear 2 which may rotate about, but not move along, its axis of rotation 4—4. In that figure, the solid lines outline the position of gear 1 when it is "in gear"; the broken lines show its position when "in neutral." The width of gear 2 is greater than the range of movement of gear 1 along shaft 3 and the gears are never disengaged. It is apparent that my device can be adapted to any type of gear 1, helical or otherwise, by proper design of gear 2.

Gear 2 is formed with neck 5 as an extension from one of its sides, and as shown in broken lines in Figure 3 is bored internally so that shaft 6 may pass thru neck 5 with a turning fit. The main portion of gear 2 is hollowed cylindrically to receive inner brake member 10 which is itself mountable on shaft 6.

Shaft 6 shown best in Figures 5 and 6, which does not rotate is mounted at each end in supporting members 19 and 20 and may within a limited range be moved in the direction of its length within these members. Supporting member 20 (Figures 7 and 9) is bored to receive the enlarged end 7 of shaft 6, its internal surface being formed with splines 21 to key with the external splines 7 and shaft 6. Supporting member 19 has a smoothly turned hole 22 thru which shaft 6 is slideable, and a larger hole 23 in which neck 5 of gear 2 is rotatable.

To more sharply define the limit of movement of shaft 6, there is seated in the wall of hole 22 of supporting member 19, under spring pressure, a ball 24 that extends partially into hole 22. Concomitant with ball 24, are two spaced circular depressions 9 in shaft 6 into which ball 24 fits. Sliding shaft 6 to either end of its desired range of movement will engage it with ball 24 from which disengagement may be readily made when desired by shifting the gear shift lever of the car as explained further on.

Shaft 6 for approximately half of its length is turned down to a smooth surface. Its other half is provided with splines 7. Also in its enlarged portion, slot 8 is provided into which is fitted a suitable extension 27 from the gear shift lever of the motor vehicle, by which shaft 6 is moved lengthwise in supporting members 19 and 20. In Figure 5 this extension 27 is illustrated broken away from the rest of the gear shift lever which is not shown.

When my device is applied to an existing transmission, a portion of the transmission case may be cut away and supporting members 19 and 20 bolted or otherwise secured to the case to properly position gear 2 with respect to gear 1 or its equivalent. A cover 28 for my device secured to the case will provide complete closure of all moving parts. If desired the supporting features may be incorporated as part of the encasement.

Gear 2 it will be noted is rotatable on shaft 6 and its neck 5 rotatable within supporting member 19. Inner brake member 10 (see Figures 10 and 11) fits partially within gear 2, neck portion 12 fitting within supporting member 20. Inner brake member 10 is concentric with shaft 6 and the central opening thru which shaft 6 passes is part bronze bushing and part splines 11. When shaft 6 is shifted to one position in its supporting members 19 and 20, its splines 7 will engage splines 11 of the inner brake member as well as splines 21 of supporting member 20 and thus lock inner brake member 10 with supporting member 20. Moved to its other position, shaft 6 will disengage from inner brake member 10 leaving it free to rotate on its bushing.

To speed the movement of shaft 6 when it is shifted into engagement with inner brake member 10 there is provided hole 25 in the end of shaft 6 into which spring 26 is seated. Withdrawing shaft 6 from engagement with inner brake member 10 places spring 26 under compression, it bearing on a fixed portion of the transmission casing. Shifting the gear shift lever from reverse position causes ball 24 to unseat from circular depression 9 and immediately thereafter spring 26 causes shaft 6 to snap into engagement with inner brake member 10. To further expedite this engagement of splines 7 and 11 the splines at their ends are tapered as is customary with gears and the like, meshed while in motion relative to each other.

On inner brake member 10, shoulder 18 is formed about neck 12. Washers 29 encircle shoulder 18 and serve to reduce wear between gear 2 and supporting member 20.

The main portion of inner brake member 10 in front elevational outline is characterized by four radial arms 13, radiating outward, whose outer surfaces conform to a circle concentric with shaft 6 and which leaves them free to turn within gear 2. In the cut out portions of the inner brake member between arms 13, the circular surfaces do not conform to a circle of common center but form ramps 17. Between arms 13 and on ramps 17 lie roller brake elements 14. Projecting from a hole in the deeper end wall of each arm 13 is a coiled spring 16 seated in spring cap 15 pressing against roller brake element 14. When gear 2 rotates toward spring caps 15 it carries roller brake elements 14 into the deeper portion of the space between arms 13 (Figure 14); when rotating away from spring caps 15 it carries roller brake elements 14 up ramps 17 and wedges them causing gear 2 to lock with inner brake member 10 (Figure 15). If inner brake member 10 is not keyed on shaft 6 with splines 7 it will rotate with gear 2 when so locked; if keyed on shaft 6 it will remain motionless and prevent gear 2 from rotating.

From the detailed description it may be seen that except when the gear shaft lever is "in reverse" the shaft 6 is keyed to inner brake member 10 which will permit gear 2 to revolve in only one direction. This permits gear 1 to likewise rotate only in one direction, that is, in the direction it moves when the car goes forward.

Moving the gear shift lever to "reverse" will withdraw shaft 6 from spline engagement with inner brake member 10 leaving it free to revolve with gear 2 when locked with it.

The action of my device is entirely automatic and functions without the conscious knowledge of the operator, preventing the vehicle from rolling backward when in neutral or at any stage of gear shifting except reverse.

My invention can be applied to an existing transmission system or constructed in the manufacture of new ones irrespective of the type of gear teeth employed. When no gear in the designed transmission system lends itself to coaction with my device then it becomes necessary to mount an additional gear on the drive shaft to serve in the same manner as gear 1 of the illustration hereinbefore given. In the case of silent gear shift transmission, for example, such an additional gear can be attached to the drive shaft in the transmission.

It is evident that many modifications of my invention may be made. The foregoing description is intended to be illustrative only and in no way limiting upon the scope of my invention.

What I claim is:

1. In a motor vehicle a member geared to the drive shaft and rotatable in one direction only about a normally fixed brake member concentrically mounted therewith on a shaft, and means for rendering such brake member freely rotatable.

2. In a motor vehicle a wheel geared to the drive shaft rotatable about a normally fixed member concentrically mounted therewith on a shaft, braking means between such wheel and fixed member limiting the direction of rotation of such wheel, and means for rendering such member freely rotatable.

3. In a motor vehicle a one-way brake comprising a wheel geared to the drive shaft, a rotatable brake member concentrically mounted within said wheel, said wheel being rotatable in one direction about such brake member and self lockable therewith upon reversal of direction, and a gear shift controlled shaft adapted to make such within contained member non-rotatable.

4. In a motor vehicle a one-way brake comprising a non-rotatable shaft, a gear rotatable on said shaft, a brake member concentrically mounted within such gear and keyable on said shaft, means for moving said shaft out of keyed relation with such brake member, and an inclined plane cooperating with roller elements disposed between such gear and brake member.

5. In a motor vehicle a one-way brake comprising a slidable shaft keyed in a fixed support, a gear rotatable on said shaft and about an inner brake member keyable on said shaft, an inclined plane disposed between such gear and inner brake member, a roller adapted to roll up such inclined plane, and a compressed spring disposed between such roller and inner brake member.

6. A device to prevent undesired rearward movement of a vehicle, comprising a non-rotatable shaft slidable in fixed supports and mounting a wheel geared to the drive shaft of the vehicle, an inner brake member on the non-rotatable shaft and keyable thereto, and means disposed between the wheel and the inner brake member for locking the same together when the wheel rotates in other than a direction imparted by a forward movement of the vehicle.

7. A device to prevent undesired rearward movement of a vehicle, comprising a non-rotatable shaft slidable in fixed supports, a wheel geared to the drive shaft of the vehicle mounted on such non-rotatable shaft and rotatable about an inner brake member, an inner brake member on the non-rotatable shaft and keyable thereto, and means disposed between the wheel and the inner brake member for locking the same together when the wheel rotates in other than a direction imparted by a forward movement of the vehicle.

8. A device to prevent undesired rearward movement of a vehicle comprising a non-rotatable shaft slidable with limited movement in fixed supports and mounting a wheel geared to the drive shaft of the vehicle, a circular inner brake member contained within said wheel and keyable to said non-rotatable shaft, a recess in the circumference of such inner brake member containing an inclined plane, and a roller under spring pressure disposed in such recess to be wedgable between said inclined plane and said wheel.

9. In a motor vehicle a one-way braking device comprising a non-rotatable shaft slidable with limited movement in fixed supports, a circular inner brake member mounted on and keyable with said non-rotatable shaft, a wheel geared to the drive shaft of the vehicle mounted on said non-rotatable shaft and rotatable about such circular inner brake member, a recess in the circumference of said inner brake member tapering the clearance between its depressed surface and said wheel, and a roller in such recess under spring pressure adapted to roll upward in such recess beyond the periphery of said circular inner brake member.

SYLVESTER BROKES.